(12) United States Patent
Li et al.

(10) Patent No.: US 9,548,074 B2
(45) Date of Patent: *Jan. 17, 2017

(54) PERPENDICULAR MAGNETIC RECORDING MEDIA WITH MAGNETIC ANISOTROPY GRADIENT AND LOCAL EXCHANGE COUPLING

(71) Applicant: Seagate Technology LLC, Cupertino, CA (US)

(72) Inventors: Shaoping Li, Naperville, IL (US); Kaizhong Gao, North Oaks, MN (US); Lei Wang, Apple Valley, MN (US); Wenzhong Zhu, Apple Valley, MN (US); Xiaobin Wang, Chanhassen, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/629,781

(22) Filed: Feb. 24, 2015

(65) Prior Publication Data

US 2015/0170697 A1 Jun. 18, 2015

Related U.S. Application Data

(63) Continuation of application No. 13/960,609, filed on Aug. 6, 2013, now Pat. No. 8,962,164, which is a
(Continued)

(51) Int. Cl.
*G11B 5/64* (2006.01)
*G11B 5/667* (2006.01)
(Continued)

(52) U.S. Cl.
CPC .......... *G11B 5/667* (2013.01); *B82Y 10/00* (2013.01); *G11B 5/64* (2013.01); *G11B 5/656* (2013.01);
(Continued)

(58) Field of Classification Search
None
See application file for complete search history.

(56) References Cited

U.S. PATENT DOCUMENTS 4,588,656 A 5/1986 Kitamoto et al.
4,731,300 A 3/1988 Watanabe et al.
(Continued)

FOREIGN PATENT DOCUMENTS

WO WO2004090874 10/2004

OTHER PUBLICATIONS

File History for U.S. Appl. No. 11/235,208.
(Continued)

*Primary Examiner* — Kevin Bernatz
(74) *Attorney, Agent, or Firm* — Hollingsworth Davis, LLC

(57) ABSTRACT

A perpendicular magnetic recording medium adapted for high recording density and high data recording rate comprises a non-magnetic substrate having at least one surface with a layer stack formed thereon, the layer stack including a perpendicular recording layer containing a plurality of columnar-shaped magnetic grains extending perpendicularly to the substrate surface for a length, with a first end distal the surface and a second end proximal the surface, wherein each of the magnetic grains has: (1) a gradient of perpendicular magnetic coercivity $H_k$ extending along its length between the first end and second ends; and (2) predetermined local exchange coupling strengths along the length.

19 Claims, 3 Drawing Sheets

Related U.S. Application Data continuation of application No. 13/270,715, filed on Oct. 11, 2011, now Pat. No. 8,501,330, which is a continuation of application No. 12/962,553, filed on Dec. 7, 2010, now Pat. No. 8,048,545, which is a continuation of application No. 11/235,208, filed on Sep. 27, 2005, now Pat. No. 7,846,564.

(51) Int. Cl.

| | | |
|---|---|---|
| *B82Y 10/00* | (2011.01) | |
| *G11B 5/74* | (2006.01) | |
| *G11B 5/82* | (2006.01) | |
| *G11B 5/66* | (2006.01) | |
| *H01F 41/02* | (2006.01) | |
| *G11B 5/65* | (2006.01) | |
| *G11B 5/00* | (2006.01) | |

(52) U.S. Cl.
CPC .............. *G11B 5/66* (2013.01); *G11B 5/743* (2013.01); *G11B 5/746* (2013.01); *G11B 5/82* (2013.01); *H01F 41/0206* (2013.01); *G11B 5/65* (2013.01); *G11B 2005/0029* (2013.01); *Y10S 428/90* (2013.01); *Y10T 29/4902* (2015.01); *Y10T 29/49032* (2015.01); *Y10T 29/49067* (2015.01); *Y10T 428/12458* (2015.01); *Y10T 428/12465* (2015.01); *Y10T 428/12931* (2015.01); *Y10T 428/26* (2015.01); *Y10T 428/265* (2015.01)

(56) References Cited

U.S. PATENT DOCUMENTS

| | | | |
|---|---|---|---|
| 4,745,510 A | 5/1988 | Watanabe et al. | |
| 4,775,576 A | 10/1988 | Bouchand et al. | |
| 5,432,012 A | 7/1995 | Lal et al. | |
| 5,851,643 A * | 12/1998 | Honda .................. | G11B 5/66 360/97.11 |
| 5,851,660 A | 12/1998 | Tohma et al. | |
| 6,174,597 B1 | 1/2001 | Yusu et al. | |
| 6,468,670 B1 | 10/2002 | Ikeda et al. | |
| 6,534,206 B1 | 3/2003 | Kirino et al. | |
| 6,730,421 B1 | 5/2004 | Kirino et al. | |
| 6,893,542 B1 | 5/2005 | Chen | |
| 7,384,699 B2 | 6/2008 | Nolan et al. | |
| 7,470,474 B2 * | 12/2008 | Sakawaki ............... | G11B 5/65 360/131 |
| 7,846,564 B2 * | 12/2010 | Li ......................... | B82Y 10/00 428/332 |
| 8,048,545 B2 * | 11/2011 | Li ......................... | B82Y 10/00 335/284 |
| 8,501,330 B2 * | 8/2013 | Li ......................... | B82Y 10/00 29/602.1 |
| 8,962,164 B2 * | 2/2015 | Li ......................... | B82Y 10/00 360/135 |
| 2001/0051287 A1 | 12/2001 | Kikitsu et al. | |
| 2003/0017369 A1 | 1/2003 | Hirayama et al. | |
| 2003/0035235 A1 * | 2/2003 | Ikeda ..................... | B82Y 10/00 360/59 |
| 2003/0128635 A1 | 7/2003 | Ruigrok et al. | |
| 2003/0148143 A1 * | 8/2003 | Kanbe .................... | G11B 5/66 428/829 |
| 2003/0157375 A1 | 8/2003 | Uwazumi et al. | |
| 2004/0053073 A1 | 3/2004 | Lu et al. | |
| 2004/0170869 A1 | 9/2004 | Shin et al. | |
| 2005/0036225 A1 | 2/2005 | Kai et al. | |
| 2005/0146992 A1 | 7/2005 | Inomata et al. | |
| 2005/0163962 A1 | 7/2005 | Kawato et al. | |
| 2005/0227120 A1 | 10/2005 | Ichihara et al. | |
| 2006/0204791 A1 | 9/2006 | Sakawaki et al. | |
| 2007/0058494 A1 | 3/2007 | Murakami et al. | |
| 2008/0165453 A1 | 7/2008 | Kaiser et al. | |
| 2009/0081484 A1 | 3/2009 | Watanabe | |
| 2009/0135513 A1 | 5/2009 | Inomata et al. | |
| 2009/0141399 A1 | 6/2009 | Sakawaki et al. | |

OTHER PUBLICATIONS

File History for U.S. Appl. No. 12/962,553.
File History for U.S. Appl. No. 13/270,715.
File History for U.S. Appl. No. 13/960,609.
Aharoni, "Perfect and Imperfect Particles (Invited)", IEEE Transactions on Magnetics, vol. Mag-22, No. 5, Sep. 1986, pp. 478-483.
Aharoni, "Magnetization bucking in a prolate spheroid", J. Appl. Phys. vol. 60 No. 3 Aug. 1, 1986, pp. 1118-1123.
Aharoni et al., "Magnetization Curve of the Infinite Cylinder", Physical Review, vol. 109, No. 5, Mar. 1, 1958, pp. 1522-1528.
Braun, "Thermally Activated Magnetization Reversal in Elongated Ferromagnetic Particles", Physical Review, vol. 71, No. 21, Nov. 22, 1993, pp. 3557-3560.
Brown, "Criterion for Uniform Micromagnetization", Physical Review, vol. 105, No. 5, Mar. 1, 1957, pp. 1479-1482.
Brown, "The Effect of Dislocation on Magnetization Near Saturation", Physical Review, vol. 60, Jul. 15, 1941, pp. 139-147.
Brown, "Theory of the Approach to Magnetic Saturation", Physical Review, vol. 58, Oct. 15, 1940, pp. 736-743.
Frei et al., "Critical Size and Nucleation Field of Ideal Ferromagnetic Particles", Physical Review, vol. 106, No. 3, May 1, 1957, pp. 446-454.
Honda et al., Design Consideration of Ultrahigh-Density Perpendicular Magnetic Recording Media. IEEE Transactions on Magnetics, vol. 38, No. 4, Jul. 2002, 1615-1621.
Jacobs et al., "An Approach to Elongated Fine-Particle Magnets", Physical Review, vol. 100, No. 4, Nov. 15, 1955, pp. 1060-1067.
Richter, "Model calculations of the angular dependence of the switching field of imperfect ferromagnetic particles with special reference to barium ferrite", J. Appl. Phys. vol. 65 No. 9 May 1, 1989, pp. 3597-3601.

\* cited by examiner

PERPENDICULAR MAGNETIC RECORDING MEDIA WITH MAGNETIC ANISOTROPY GRADIENT AND LOCAL EXCHANGE COUPLING

RELATED PATENT DOCUMENTS

This application is a continuation of U.S. patent application Ser. No. 13/960,609 filed on Aug. 6, 2013, now U.S. Pat. No. 8,962,164, which is a continuation of U.S. patent application Ser. No. 13/270,715, filed on Oct. 11, 2011, now U.S. Pat. No. 8,501,330, which is a continuation of U.S. patent application Ser. No. 12/962,553 filed on Dec. 7, 2010, now U.S. Pat. No. 8,048,545, which is a continuation of U.S. patent application Ser. No. 11/235,208 filed on Sep. 27, 2005, now U.S. Pat. No. 7,846,564, which are incorporated herein by reference in their entireties.

FIELD OF THE INVENTION

The present invention relates to improved perpendicular magnetic data/information storage and retrieval media. The invention has particular utility in the design and use of hard disk media comprising granular perpendicular-type magnetic recording layers.

BACKGROUND OF THE INVENTION

Magnetic media are widely used in various applications, particularly in the computer industry for data/information storage and retrieval applications and in consumer electronics, typically in disk form, and efforts are continually made with the aim of increasing the areal recording density, i.e., bit density of the magnetic media. Conventional thin-film type magnetic media, wherein a fine-grained polycrystalline magnetic alloy layer serves as the active recording layer, are generally classified as "longitudinal" or "perpendicular", depending upon the orientation of the direction of the magnetic anisotropy of the grains of magnetic material.

Perpendicular recording media have been found to be superior to longitudinal media in achieving very high bit densities without experiencing the thermal stability limit associated with the latter. In perpendicular magnetic recording media, residual magnetization is formed in a direction perpendicular to the surface of the magnetic medium, typically a layer of a magnetic material on a suitable substrate. Very high to ultra-high linear recording densities are obtainable by utilizing a "single-pole" magnetic transducer or "head" with such perpendicular magnetic media.

Efficient, high bit density recording utilizing a perpendicular magnetic medium requires interposition of a relatively thick (as compared with the magnetic recording layer), magnetically "soft" underlayer ("SUL"), i.e., a magnetic layer having a relatively lower coercivity of about 1-1,000 Oe, such as of a NiFe alloy (Permalloy), between a non-magnetic substrate, e.g., of glass, aluminum (Al) or an Al-based alloy, and a magnetically "hard" recording layer having relatively high coercivity, typically about 3-50 kOe, e.g., of a cobalt-based alloy (e.g., a Co—Cr alloy such as CoCrPtB, CoCrPtTaB, etc.) having perpendicular anisotropy. The magnetically soft underlayer serves to guide magnetic flux emanating from the head through the magnetically hard perpendicular recording layer.

A typical conventional perpendicular recording system 20 utilizing a vertically oriented magnetic medium 21 with a relatively thick soft magnetic underlayer, a relatively thin hard magnetic recording layer, and a magnetic transducer head 16, is illustrated in FIG. 1, wherein reference numerals 10, 11, 4, 5, and 6, respectively, indicate a non-magnetic substrate, an optional adhesion layer, a soft magnetic underlayer, at least one non-magnetic seed layer (sometimes referred to as an "intermediate" layer or as an "interlayer"), and at least one magnetically hard perpendicular recording layer with its magnetic easy axis substantially perpendicular to the film plane.

Still referring to FIG. 1, reference numerals 7 and 8, respectively, indicate the main (writing) and auxiliary poles of the magnetic transducer head 16. The relatively thin interlayer 5, comprised of one or more layers of non-magnetic materials, serves to (1) prevent magnetic interaction between the soft underlayer 4 and the at least one hard recording layer 6; and (2) promote desired microstructural and magnetic properties of the at least one magnetically hard recording layer.

As shown by the arrows in the figure indicating the path of the magnetic flux $\phi$, flux $\phi$ is seen as emanating from the main writing pole 7 of magnetic transducer head 16, entering and passing through the at least one vertically oriented, magnetically hard recording layer 5 in the region below main pole 7, entering and traveling within soft magnetic underlayer (SUL) 3 for a distance, and then exiting therefrom and passing through the at least one perpendicular hard magnetic recording layer 6 in the region below auxiliary pole 8 of transducer head 16. The direction of movement of perpendicular magnetic medium 21 past transducer head 16 is indicated in the figure by the arrow above medium 21.

With continued reference to FIG. 1, vertical lines 9 indicate grain boundaries of polycrystalline layers 5 and 6 of the layer stack constituting medium 21. Magnetically hard main recording layer 6 is formed on interlayer 5, and while the grains of each polycrystalline layer may be of differing widths (as measured in a horizontal direction) represented by a grain size distribution, they are generally in vertical registry (i.e., vertically "correlated" or aligned).

Completing the layer stack is a protective overcoat layer 14, such as of a diamond-like carbon (DLC), formed over hard magnetic layer 6, and a lubricant topcoat layer 15, such as of a perfluoropolyether (PFPE) material, formed over the protective overcoat layer.

Substrate 10 is typically disk-shaped and comprised of a non-magnetic metal or alloy, e.g., Al or an Al-based alloy, such as Al—Mg having a Ni—P plating layer on the deposition surface thereof, or alternatively substrate 10 is comprised of a suitable glass, ceramic, glass-ceramic, polymeric material, or a composite or laminate of these materials. Optional adhesion layer 11, if present, may comprise an up to about 200 Å thick layer of a material such as Ti, a Ti-based alloy, Cr, or a Cr-based alloy. Soft magnetic underlayer 4 is typically comprised of an about 100 to about 4,000 Å thick layer of a soft magnetic material, which, for example, may be selected from the group consisting of Ni, NiFe (Permalloy), Co, CoZr, CoZrCr, CoZrNb, CoFeZrNb, CoFe, Fe, FePt, FeBNi, FeN, FeSiAl, FeSiAlN, FeCoB, FeCoC, etc. Interlayer 5 typically comprises an up to about 300 Å thick layer or layers of non-magnetic material(s), such as Ru, TiCr, Ru/CoCr$_{37}$Pt$_6$, RuCr/CoCrPt, etc.; and the at least one magnetically hard perpendicular recording layer 6 is typically comprised of about 50 to about 250 Å thick layer(s) of, for example, Co-based alloy(s) or FePt intermetallic compounds with L1$_0$ structure and including one or more elements selected from the group consisting of Cr, Fe, Ta, Ni, Mo, Pt, V, Nb, Ge, B, N, C, and Pd.

A currently employed way of classifying magnetic recording media is on the basis by which the magnetic grains of the recording layer are mutually separated, i.e., segregated, in order to physically and magnetically de-couple the grains and provide improved media performance characteristics. According to this classification scheme, magnetic media with Co-based alloy magnetic recording layers (e.g., CoCr alloys) are classified into two distinct types: (1) a first type, wherein segregation of the grains occurs by diffusion of Cr atoms of the magnetic layer to the grain boundaries of the layer to form Cr-rich grain boundaries, which diffusion process requires heating of the media substrate during formation (deposition) of the magnetic layer; and (2) a second type, wherein segregation of the grains occurs by formation of oxides, nitrides, and/or carbides at the boundaries between adjacent magnetic grains to form so-called "granular" media, which oxides, nitrides, and/or carbides may be formed by introducing a minor amount of at least one reactive gas containing oxygen, nitrogen, and/or carbon atoms (e.g. $O_2$, $N_2$, $CO_2$, etc.) to the inert gas (e.g., Ar) atmosphere during sputter deposition of the Co alloy-based magnetic layer. The latter process does not require heating of the substrate to an elevated temperature.

Magnetic recording media with granular magnetic recording layers possess great potential for achieving very high and ultra-high areal recording densities. An advantage afforded by granular recording layers is significant suppression of media noise due to great reduction in the exchange coupling between adjacent magnetic grains, resulting from the presence of non-magnetic material, typically an oxide material, at the grain boundaries. As indicated above, current methodology for manufacturing granular-type magnetic recording media involves reactive sputtering of a target comprised of the ferromagnetic material for the magnetic recording layer (typically a Co-based alloy) in a reactive gas-containing atmosphere, e.g., an atmosphere comprising oxygen or a compound of oxygen, in order to incorporate oxides in the deposited film or layer and achieve smaller and more isolated magnetic grains. Granular magnetic layers formed in this manner have a reduced saturation magnetization ($M_s$) due to the oxide formation and consumption of a certain amount of the Co component of the ferromagnetic alloy. Alternatively, a target comprised of the ferromagnetic material (typically a Co-based alloy) and the oxide material may be directly sputtered in an inert atmosphere or an atmosphere comprising oxygen or a compound of oxygen. However, the oxide material sputtered from the target is subject to decomposition in the environment of the sputtering gas plasma, and, as a consequence, a certain amount of the Co component of the ferromagnetic alloy is again consumed.

In order to continually increase the bit density of recording over the next decade, it will be necessary to achieve a corresponding continual decrease of the dimensions of the magnetic grains in order to maintain a good signal-to-noise ration (SNR) of the magnetic media. Therefore, in practice, it will be necessary to decrease the grain volume as the desired linear recording density increases in order to maintain a usable SNR. Such reduction in magnetic grain size, however, will result in grain sizes which approach the so-called superparamagnetic limit of magnetic particles and thereby limit the ability of the media to retain stored information without significant thermal decay. A significant factor with thermal decay associated with grain sizes approaching the superparamagnetic limit is the steepness of onset of the thermal decay. In this regard, it has been estimated that at a certain point a 15% decrease of grain diameter can result in a reduction of storage lifetime of the media from about 20 years to as little as 1 day.

One proposal for overcoming the superparamagnetic limit is to raise the energy barrier to thermal reversal of grain magnetization by development of media with higher coercivity. However, such approach is problematic in designing high data recording rate media because media with very high coercivities greater than about 10,000 Oe cannot be accurately written to by means of the head fields provided by currently available read/write transducers. This is especially true in high frequency recording applications because of a drastic increase in dynamic coercivity, resulting in inability of the write field to function at high frequency, leading to incomplete magnetization reversal and causing significant increases in noise level and error rate.

Since the early 1990's, advanced magnetic media have been designed and fabricated for achieving better SNR's. For example, dual layer longitudinal CoNiCr/CoCrTa and dual layer CoCrPt/CoCrPtSi gradient media were fabricated in order to enhance the SNR. Such dual layer media actually are gradient systems wherein the top (upper) layer provides the media with high coercivity and the lower layer is optimized for reducing media noise.

The ever-increasing need for disk drive media and systems with higher storage capacities, faster data read/write rates, and lower costs form a triad of conflicting and competing requirements for designing, developing, and fabricating the next generation of disk drives. As a consequence, the magnetic recording media design practice faces a number of challenges extending magnetic recording technology to its limits.

Inasmuch as perpendicular magnetic recording media are expected to remain the predominant type of magnetic media for use in disk drives for at least the foreseeable future (e.g., 5-6 years), unique design and engineering schemes are considered necessary for fabrication of improved perpendicular media capable of meeting future challenges and requirements for high recording density, high data recording rate disk drive applications.

In view of the foregoing, there exists a clear need for a new avenue or approach for the engineering and development of advanced perpendicular magnetic recording media which achieves the goals of high linear recording density and high data recording rate without significant loss of thermal stability.

The present invention addresses and solves the need for engineering and development of improved, high performance advanced perpendicular magnetic recording media suitable for use in disk drives, comprising a novel combination of gradient magnetic properties and local vertical exchange coupling, while maintaining full compatibility with all requirements of cost-effective automated fabrication processing.

DISCLOSURE OF THE INVENTION

An advantage of the present invention is improved perpendicular magnetic recording medium adapted for high recording density and high data recording rate.

Another advantage of the present invention is an improved method for performing magnetic data/information storage and retrieval at a high recording density and high data recording rate.

Still another advantage of the present invention is an improved method for fabricating magnetic data/information storage and retrieval media having a high recording density and high data recording rate.

Additional advantages and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by an improved perpendicular magnetic recording medium adapted for high recording density and data recording rate, comprising:

(a) a non-magnetic substrate having at least one surface; and (b) a layer stack formed on the surface of the substrate, the layer stack including a perpendicular recording layer containing a plurality of columnar-shaped magnetic grains extending perpendicularly to the substrate surface for a length, with a first end distal the substrate surface and a second end proximal the substrate surface, wherein each of the magnetic grains:

(1) has a gradient of perpendicular magnetic coercivity $H_k$ extending along its length between the first and second ends; and (2) has predetermined local exchange coupling strengths along its length.

In accordance with embodiments of the present invention, application of an external magnetic field to the recording layer induces a progressive reversal process of an initial magnetization direction of each of the plurality of columnar-shaped magnetic grains which originates at one of the ends, progresses toward the other end, and results in reversal of the initial magnetization direction to yield a final magnetization direction.

According to preferred embodiments of the invention, the perpendicular magnetic coercivity decreases from the first end to the second end of each of the grains.

Preferably, each of the magnetic grains comprises a plurality of overlying sub-layers of magnetic material, each of the sub-layers of magnetic material having a different perpendicular magnetic coercivity which progressively decreases from a sub-layer at the first end to a sub-layer at the second end of each of the magnetic grains.

In accordance with embodiments of the present invention, tailoring of the local exchange coupling strength between adjacent sub-layers to achieve a desired coupling strength is accomplished by utilizing one or more of the following means: (1) a non-magnetic, paramagnetic, or superparamagnetic spacer layer of selected thickness positioned at the interface between the adjacent sub-layers; (2) adjacent sub-layers positioned in direct contact; and (3) a magnetic layer of selected thickness positioned between adjacent magnetically hard sub-layers.

According to embodiments of the invention, each of the magnetic grains comprises two overlying sub-layers with different magnetic material composition, a first sub-layer at the first end of each of the magnetic grains is comprised of $CoCrX_1$ first magnetic material, where $X_1$ is at least one element selected from the group consisting of Ta, Pt, B, V, C, Nd, Cu, Zr, Fe, P, O, Si, and Ni, with a magnetic moment $M_r$ from about 200 to about 800 emu/cc, a relatively high perpendicular coercivity $H_k$ from about 8,000 to about 20,000 Oe, a thickness $\delta_1$ from about 6 to about 25 nm, and a grain size from about 4 to about 10 nm; a second sub-layer at the second end of each of the magnetic grains is comprised of $CoX_2$ second magnetic material, where $X_2$ is at least one element selected from the group consisting of C, B, Cr, Pt, O, Fe, Ta, Cu, Nd, Ni, and Ti, with a magnetic moment $M_r$ from about 400 to about 900 emu/cc, a relatively low perpendicular coercivity $H_k$ from about 1,000 to about 9,000 Oe, a thickness $\delta_2$ from about 3 to about 15 nm, and a crystal structure and grain size matching those of the first sub-layer; and the total thickness $\delta_1+\delta_2$ of the first and second sub-layers is less than the exchange coupling distances of the magnetic materials, whereby domain walls are not present in the magnetic grains. According to this embodiment, a non-magnetic spacer layer is present at an interface between the first and second sub-layers for providing an interfacial coupling strength between the first and second sub-layers from about $10^{-2}$ to about $10^{-9}$ erg/cm, the spacer layer having a thickness up to about 5 nm and comprised of at least one non-magnetic element selected from the group consisting of Cr, Pt, Cu, Zr, V, C, Ru, Ta, and Si.

Further embodiments of the present invention include those wherein each of the magnetic grains comprises three overlying sub-layers with different magnetic material composition, wherein the relatively high perpendicular magnetic coercivity $H_{k1}$ of a first sublayer at the first end is about 12,000 Oe, the relatively low perpendicular magnetic coercivity $H_{k3}$ of a third sub-layer at the second end is about 3,000 Oe, the perpendicular magnetic coercivity $H_{k2}$ of a second sub-layer intermediate the first and third sub-layers is about 9,000 Oe, and the thickness of each of the three sub-layers is about 6-8 nm.

Still other embodiments of the present invention include those wherein each of the magnetic grains comprises four overlying sub-layers with different magnetic material compositions, the relatively high perpendicular magnetic coercivity $H_{k1}$ of a first sub-layer at the first end being about 12,000 Oe, the relatively low perpendicular magnetic coercivity $H_{k4}$ of a fourth sub-layer at the second end being about 3,000 Oe, the perpendicular magnetic coercivity $H_{k2}$ of a second sub-layer adjacent the first sub-layer being about 9,000 Oe, the perpendicular magnetic coercivity $H_{k3}$ of a third sub-layer adjacent the second sub-layer being about 6,000 Oe and the thickness of each of the four sub-layers is about 5 nm.

In accordance with preferred embodiments of the present invention, the perpendicular recording layer is a granular type layer, and the layer stack comprises a magnetically soft underlayer (SUL) intermediate the recording layer and the substrate surface.

Another aspect of the present invention is an improved method for performing magnetic data/information storage and retrieval at a high recording density and high data recording rate, comprising steps of:

(a) providing a magnetic recording medium comprising:
(i) a non-magnetic substrate having at least one surface; and
(ii) a layer stack formed on the surface of the substrate, the layer stack including a perpendicular recording layer containing a plurality of columnar-shaped magnetic grains extending perpendicularly to the substrate surface for a length, with a first end distal the substrate surface and a second end proximal the substrate surface, wherein each of the columnar-shaped magnetic grains has a gradient of perpendicular magnetic coercivity $H_k$ extending along its length between the first and second ends, and predetermined local exchange coupling strengths along its length; and (b) applying an external magnetic field to the recording layer to reverse an initial magnetization direction of each of the plurality of columnar-shaped magnetic grains to yield a final magnetization direction.

According to embodiments of the invention, step (b) comprises inducing a magnetization reversal process of the initial magnetization direction of each of the plurality of magnetic grains which originates at one of the ends and progresses toward the other of the ends to result in reversal of the initial magnetization direction to yield a final magnetization direction.

According to embodiments of the present invention, step (a) preferably comprises providing a magnetic recording medium wherein the perpendicular magnetic coercivity decreases from the first end to the second end of each of the grains.

Preferably, step (a) comprises providing a magnetic recording medium wherein each of the magnetic grains comprises a plurality of overlying sub-layers of magnetic material, each of the sub-layers of magnetic material having a different perpendicular magnetic coercivity which progressively decreases from a sub-layer at the first end to a sub-layer at the second end of each of the magnetic grains.

In accordance with embodiments of the present invention, step (a) comprises providing a magnetic recording medium wherein tailoring of the local exchange coupling strength between adjacent sub-layers to achieve a desired coupling strength is accomplished by utilizing one or more of the following approaches: (1) positioning a non-magnetic, paramagnetic, or superparamagnetic interfacial spacer layer of selected thickness at the interface between the adjacent sub-layers; (2) forming the adjacent sub-layers in direct contact; and (3) positioning a magnetic layer of selected thickness between adjacent magnetically hard sub-layers.

Still another aspect of the present invention is a method of fabricating a magnetic data/information storage and retrieval medium having high recording density and high data recording rate, comprising steps of:

(a) providing a non-magnetic substrate having at least one surface; and (b) forming a layer stack on the at least one surface, the layer stack including a soft magnetic underlayer (SUL) and an overlying perpendicular recording layer containing a plurality of columnar-shaped magnetic grains extending for a length perpendicularly to the substrate surface, with a first end distal the substrate surface and a second end proximal the substrate surface, wherein each of the columnar-shaped magnetic grains has a gradient of perpendicular magnetic coercivity $H_k$ extending along its length between the first and second ends, and predetermined local exchange coupling strengths along its length.

According to embodiments of the present invention, step (a) comprises forming a perpendicular recording layer wherein the perpendicular magnetic coercivity decreases from the first end to the second end of each of the grains.

Embodiments of the present invention include those wherein step (a) comprises forming a perpendicular recording layer wherein each of the magnetic grains comprises a plurality of overlying sub-layers of magnetic material, each of the sub-layers of magnetic material having a different perpendicular magnetic coercivity which progressively decreases from a sub-layer at the first end to a sub-layer at the second end of each of the magnetic grains.

In accordance with certain embodiments of the present invention, step (a) comprises forming a perpendicular recording layer wherein tailoring of the local exchange coupling strength between adjacent sub-layers to achieve a desired coupling strength is accomplished by utilizing one or more of the following approaches: (1) positioning a non-magnetic, paramagnetic, or superparamagnetic interfacial spacer layer of selected thickness at the interface between the adjacent sub-layers; (2) forming the adjacent sub-layers in direct contact; and (3) positioning a magnetic layer of selected thickness between adjacent magnetically hard sub-layers.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features and the same reference numerals are employed throughout for designating similar features, wherein.

DETAILED DESCRIPTION OF THE INVENTION

The present invention is based upon recognition by the inventors that perpendicular magnetic recording media fabricated with a main recording layer comprised of columnar-shaped magnetic grains with specifically designed gradients of magnetic anisotropy, i.e., gradients of perpendicular magnetic coercivity ($H_k$), and with local exchange coupling strengths which provide good writability and signal-to-noise ratio (SNR) at ultra-high recording densities (i.e., >~250

Gbits/in$^2$) and high data recording rates (i.e., >~2,000 Mbits/sec.) without significant sacrifice in thermal stability of the media. Further, it has been determined that all significant performance parameters of the media can be controllably optimized via appropriate selection of the H$_k$ gradient and local exchange coupling strength(s).

Figure 1:
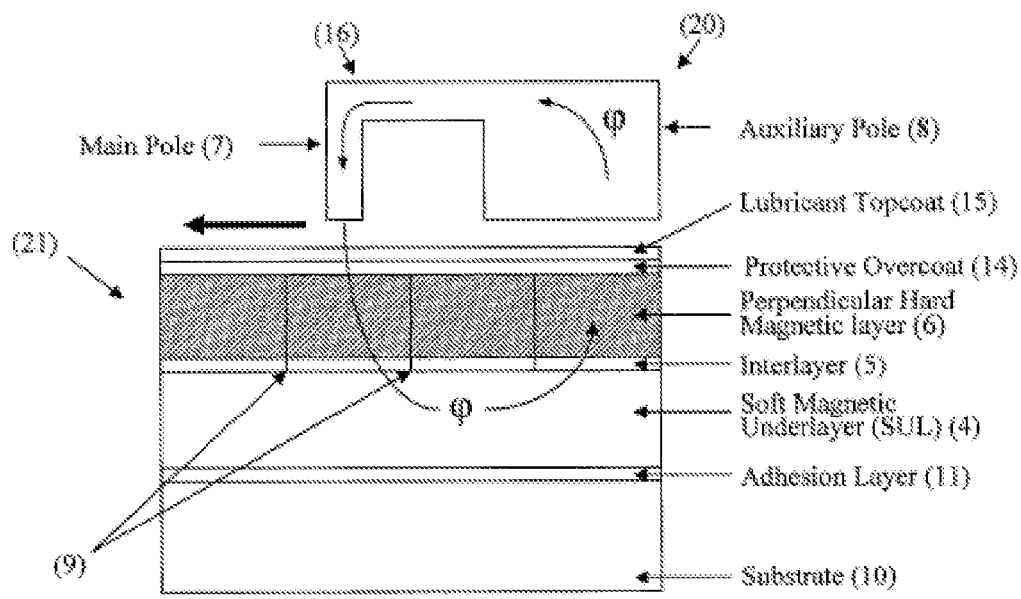
FIG. 1 schematically illustrates, in simplified cross-sectional view, a portion of a magnetic recording, storage, and retrieval system according to the conventional art, comprised of a perpendicular magnetic recording medium and a single pole transducer head.

Briefly stated, perpendicular media and systems fabricated according to the principles of the invention are structurally similar to media 21 and system 20 shown in FIG. 1, except that the magnetically hard perpendicular magnetic recording layer 6 is replaced with recording layer 6', which, as indicated above, comprises a plurality of columnar-shaped magnetic grains with specifically designed gradients of magnetic anisotropy, i.e., gradients of perpendicular magnetic coercivity (H$_k$), and with preselected local exchange coupling strengths.

Figure 2:
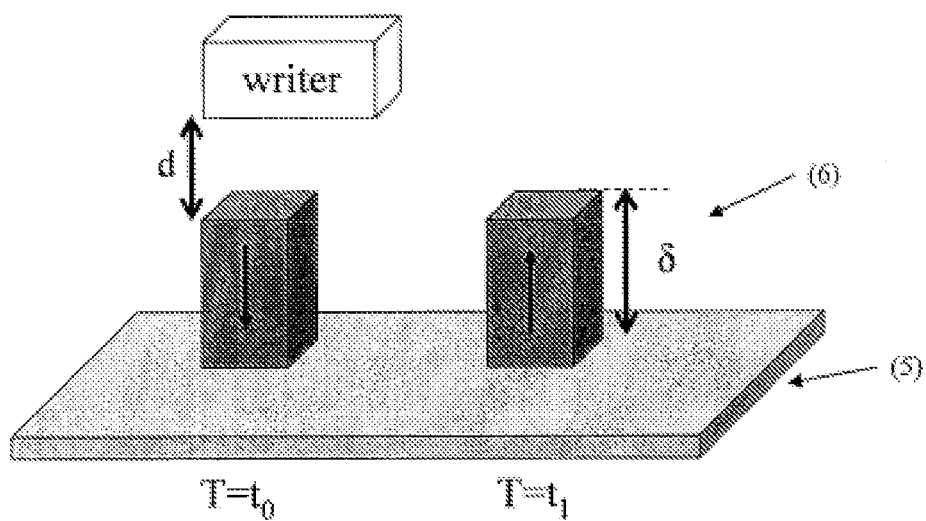
FIG. 2 schematically illustrates the magnetism reversal mechanism of the magnetically hard perpendicular magnetic recording layer of the conventional perpendicular medium of FIG. 1.
Figure 3:
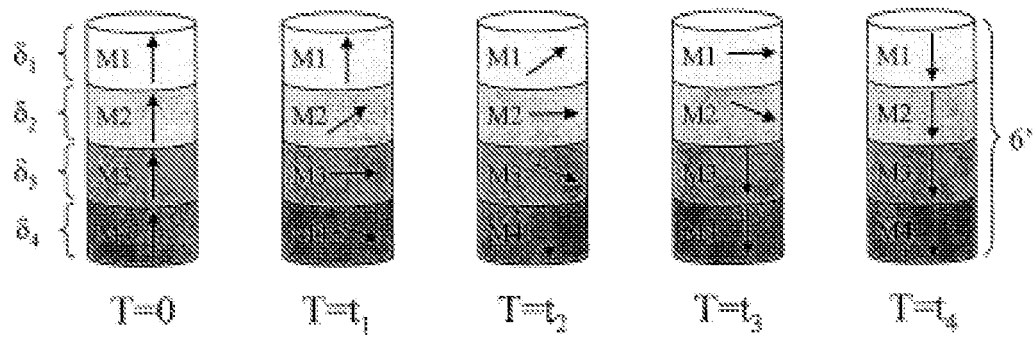
FIG. 3 schematically shows the quasi-incoherent ("buckling") magnetization reversal process of a magnetically hard perpendicular recording layer of a perpendicular medium according to the invention, comprised of a stack of 4 sub-layers.

The principles of the present invention will now be described with reference to FIGS. 2 and 3, wherein FIG. 2 illustrates the magnetism reversal mechanisms of the magnetically hard perpendicular magnetic recording layer 6 of a conventional perpendicular medium (such as media 21) including a uniform magnetic grain of thickness δ and FIG. 3 shows the progressive, quasi-incoherent magnetization reversal process (such as a "buckling" process) of a magnetically hard perpendicular recording layer 6' of a perpendicular medium according to the invention. (In each of these figures, the direction of magnetization within a grain or sub-layer is indicated by the arrow, and optional interlayer 5 of FIG. 1 is omitted for clarity).

More specifically, FIG. 2 shows the coherent magnetization reversal ("rotation") process within a conventional (i.e., uniform) columnar-shaped magnetic grain which is effected by means of an externally applied magnetic field from a write head spaced at a distance d from the upper end of the magnetic grain (in the following the head field gradient is assumed to be Karlqvist type), where the initial magnetization direction prior to application of the external magnetic field is indicated at T=t$_o$ and the final magnetization direction after application of the external magnetic field is indicated at T=t$_1$; whereas FIG. 3 shows the quasi-incoherent magnetization reversal process (such as a "buckling" process) of a magnetic grain according to the invention, comprised of 4 moderately exchange coupled, vertically stacked sub-layers M$_1$, M$_2$, M$_3$, and M$_4$ with respective thicknesses δ$_1$, δ$_2$, δ$_3$, and δ$_4$, and where the perpendicular magnetic coercivity H$_k$ progressively decreases from sub-layer M$_1$ to sub-layer M$_4$ (SUL 5 is omitted from the figure for clarity). As shown, the magnetization direction of each of the sub-layers M$_1$ to M$_4$ is the same at T=t$_o$ (i.e., the initial magnetization direction before application of an external magnetic field from the write head), and magnetization reversal ("rotation") occurs quasi-incoherently in progressive stages illustrated at T=t$_1$, T=t$_2$, and T=t$_3$. Complete reversal of the initial magnetization direction is indicated at T=t$_4$.

In the above, H$_{k1}$>H$_{k2}$>H$_{k3}$>H$_{k4}$, the topmost sub-layer M$_1$ has the highest switching field, and it is assumed that the permeability of the underlying SUL is infinite. Assuming that no interlayer (e.g., such as layer 5 of FIG. 1) is present, according to the incoherent magnetization reversal process of the invention, the magnetization direction of sub-layers M$_1$, M$_2$, M$_3$, and M$_4$ occurs sequentially, as illustrated. The magnetization reversal process is initiated at the bottom-most sub-layer M$_4$ of lowest perpendicular magnetic coercivity H$_{k4}$, and proceeds upwardly in sequence from sub-layer M$_4$ to the overlying sub-layers M$_3$ and M$_2$ of progressively lower perpendicular magnetic coercivities H$_{k3}$ and H$_{k2}$, and is ultimately controlled by the topmost sub-layer M$_1$ of greatest perpendicular magnetic coercivity H$_{k1}$. More particularly, re-orientation or reversal of the magnetization direction of the entire grain occurs when the magnetization direction of the topmost sub-layer M$_1$ is completely reversed (as at T=t$_4$ in the illustrated case).

Stated differently, when the magnetic grains are comprised of sub-layers with a coercivity gradient, application of the external writing field from the head causes the sub-layer with the smallest perpendicular magnetic coercivity H$_k$, i.e., the lowermost sub-layer of the stack, to switch or reverse its magnetization direction. This substantially simultaneously induces a quasi-incoherent rotation process in the overlying sub-layers of higher magnetic coercivity. The magnetization reversal process in each grain is essentially an incoherent rotation process, i.e., a type of induced "quasi-buckling" or "curling" process, which is generated in the lowermost sub-layer with high magnetic moment and relatively lower intrinsic coercivity, via tailored exchange interactions. By contrast, coherent magnetization reversal in conventional magnetic grains requires a larger switching field and poor media writability, resulting in difficulty in obtaining high density recording with good writability and thermal stability.

It is also noted that, with the materials conventionally utilized for fabricating high performance magnetic recording media, the intrinsic exchange coupling within the media is usually too strong to allow for any incoherent magnetization reversal as required by the invention. Therefore, according to the inventive methodology, multi-step incoherent magnetization reversal within the grains is facilitated by suitably tailoring the perpendicular magnetic coercivity of the various sub-layers to obtain a desired gradient of H$_k$ and the local exchange coupling strengths between adjacent sub-layers. In this regard, it is noted that the strength of the exchange coupling between adjacent sub-layers and the thickness of each sub-layer play important roles in dictating the overall magnetization reversal/re-orientation process. For example, if the exchange coupling strength is too small, the overall magnetization reversal/re-orientation process can become a quasi-fanning process which does not afford good thermal stability. On the other hand, if the thickness of the lower-most sub-layer is too little, triggering of the magnetization reversal process would not be strong enough to induce incoherent magnetization reversal in the overlying layers if the exchange coupling strength is too high. Tailoring of the local exchange coupling strength between adjacent sub-layers is therefore necessary in order to achieve maximum local magnetization reversal torque, and for significantly reducing the overall switching field of each grain.

Figure 4:
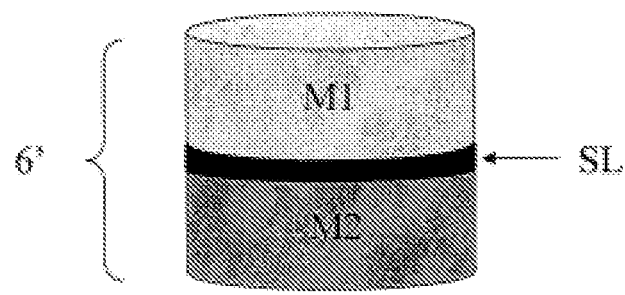
FIG. 4 schematically illustrates a perpendicular recording layer according to embodiments of the invention wherein a non-magnetic spacer layer positioned at the interface between adjacent sub-layers is utilized for tailoring the local exchange coupling strength between the sub-layers.
Figure 5:
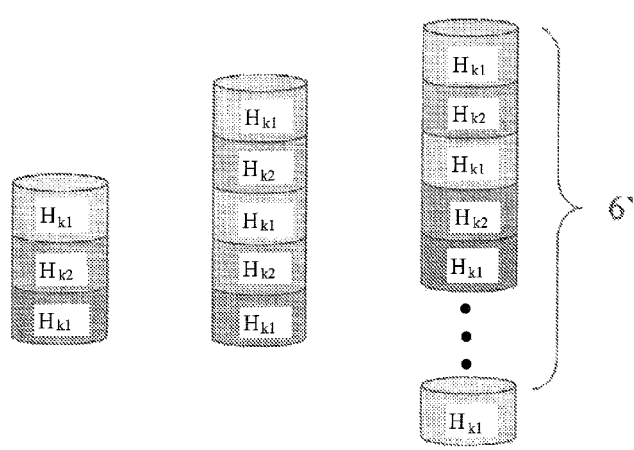
FIG. 5 schematically illustrates a perpendicular recording layer according to embodiments of the invention wherein layers of soft magnetic material are positioned between adjacent sub-layers of magnetically hard material for tailoring the local exchange coupling strength between the sub-layers.

According to the invention, tailoring of the local exchange coupling strength between adjacent sub-layers to achieve a desired coupling strength is accomplished by utilizing one or more of the following approaches: (1) positioning a non-magnetic, paramagnetic, or superparamagnetic spacer layer SL of selected thickness at the interface between adjacent sub-layers, as schematically shown in FIG. 4; (2) forming the adjacent sub-layers in direct contact; and (3) positioning a magnetic layer of selected thickness between adjacent magnetically hard sub-layers, as schematically shown in FIG. 5 for a grain structure comprised of n stacked sub-layers of magnetically hard material with intervening magnetic layers.

It should be noted that despite apparent differences of approaches (1)-(3), the underlying physics is equivalent, because the fundamental magnetic properties of the magnetic material are associated with the dimensionality of the material per se. For quasi one-dimensional and two-dimensional thin-film magnetic materials, the weak spin effects will lead to reductions in the anisotropy, magnetic moment, and local exchange coupling strength. Approach (3) has an advantage in that continuity of the microstructure of the magnetic grains is more easily maintained. Finally, manipulation of the sub-layer thicknesses allows obtaining of desirable local magnetic properties for achieving optimal recording performance.

Tailoring of the magnetic anisotropies, i.e., the perpendicular magnetic coercivities $H_k$, of each of the sub-layers is accomplished, in known fashion, as by appropriate selection of the magnetic alloys and their processing conditions; and each of the sub-layers and spacer layers are sequentially epitaxially deposited (by conventional methodologies, including sputtering techniques) so as to replicate the crystal structure and cross-sectional dimensions of the underlying grains (i.e., grain sizes) and form a magnetically hard perpendicular recording layer comprised of columnar-shaped magnetic grains extending perpendicularly to a substrate for a desired length. Granular perpendicular magnetic recording layers embodying the principles of the present invention may be formed by means of reactive sputtering techniques, as known in the art and described above.

Advantageously, when the magnetization reversal process is incoherent according to the invention, the read/write head spacing is reduced, as compared with the head-media spacing (HMS) with conventional coherent magnetization reversal. More specifically, in the incoherent case (FIG. 3), the HMS is given by $(d+\delta_1/2)$, which is much smaller than the d spacing in the coherent case (FIG. 2), which is given by $(d+\delta_2)$. For instance, if d=6 nm and $\delta$=20 nm in the conventional, coherent reversal case, and $\delta_1$=5 nm in the incoherent reversal case, the effective HMS would be 8.5 nm in the incoherent case and 16 nm in the coherent case. As a consequence, the SNR's of the inventive coercivity gradient grains and conventional, uniform grains will be dramatically different. For example, it is conservatively estimated that use of a 3 sub-layer perpendicular magnetic recording layer with coercivity gradient according to the invention would provide at least a 1-3 db increase in SNR (facilitating a corresponding increase in recording density) by virtue of the dramatic decrease in HMS afforded by the invention.

Figures 6A, 6B:
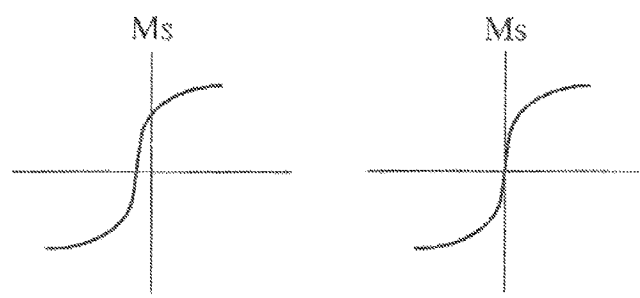
FIGS. 6(A)-6(B), respectively, graphically show the magnetization distributions at the written transitions in the case of large and small deviation angles of the easy axis of magnetic media.

It should be noted that the head field magnetic gradient should be less than the gradient of magnetic coercivity of the various sub-layers constituting the magnetic grains, which requirement places several constraints on media design practice, resulting in significant reduction of the effective head-media spacing (HMS), and thus providing a very substantial improvement in recording performance. In addition, it should be recognized that coercivity gradient perpendicular media fabricated according to the invention can also advantageously exhibit substantially reduced easy axis distributions by virtue of the presence of several sub-layers within a single columnar-shaped magnetic grain, leading to a reduction of the media switching distribution and an increase in the media nucleation field. In this regard, the number of sub-layers within a grain is not limited to the illustrative embodiments described below which comprise 2, 3, or 4 sub-layers. Rather, the greater the number of sub-layers within a grain, the smaller the deviation angle of the easy axis. As a consequence, the resultant magnetization becomes sharper and/or more symmetric at the written transition locations. For example, FIGS. 6(A)-6(B), respectively, graphically show the magnetization distributions at the written transitions in the case of large and small deviation angles of the easy axis, wherein it is evident that the resultant magnetization becomes sharper and/or more symmetric at the written transition locations when the deviation angles of the easy axis are smaller.

Additional advantages of the inventive media include reduced grain size distributions and the ability to fabricate granular media with ultra-small grain sizes via reactive oxidation/sputtering processing.

According to an illustrative, but non-limitative, embodiment of the invention, each of the columnar-shaped magnetic grains comprises two overlying sub-layers with different magnetic material composition. A first sub-layer at the first (upper) end of each of the magnetic grains is comprised of $CoCrX_1$ first magnetic material, where $X_1$ is at least one element selected from the group consisting of Ta, Pt, B, V, C, Nd, Cu, Zr, Fe, P, O, Si, and Ni, with a magnetic moment $M_r$ from about 200 to about 800 emu/cc, a relatively high perpendicular coercivity $H_k$ from about 8,000 to about 20,000 Oe, a thickness $\delta_1$ from about 6 to about 25 nm, and a grain size from about 4 to about 10 nm. A second sub-layer at the second (lower) end of each of the magnetic grains is comprised of $CoX_2$ second magnetic material, where $X_2$ is at least one element selected from the group consisting of C, B, Cr, Pt, O, Fe, Ta, Cu, Nd, Ni, and Ti, with a magnetic moment $M_r$ from about 400 to about 900 emu/cc, a relatively low perpendicular coercivity $H_k$ from about 1,000 to about 9,000 Oe, a thickness $\delta_2$ from about 3 to about 15 nm, and a crystal structure and grain size matching those of the first sub-layer. The total thickness $\delta_1+\delta_2$ of the first and second sub-layers is less than the exchange coupling distances of the magnetic materials, whereby domain walls are not present in the magnetic grains. According to this embodiment, a non-magnetic spacer layer is present at an interface between the first and second sub-layers for providing an interfacial coupling strength between the first and second sub-layers from about $10^{-2}$ to about $10^{-9}$ erg/cm, the spacer layer having a thickness up to about 5 nm and comprised of at least one non-magnetic element selected from the group consisting of Cr, Pt, Cu, Zr, V, C, Ru, Ta, and Si.

In accordance with another illustrative, non-limitative embodiment according to the present invention, each of the magnetic grains comprises three overlying sub-layers with different magnetic material composition, wherein the relatively high perpendicular magnetic coercivity $H_{k1}$ of a first sublayer at the first (upper) end is about 12,000 Oe, the relatively low perpendicular magnetic coercivity $H_{k3}$ of a third sub-layer at the second (lower) end is about 3,000 Oe, and the perpendicular magnetic coercivity $H_{k2}$ of a second sub-layer intermediate the first and third sub-layers is about 9,000 Oe. The thickness of each of the three sub-layers is about 6-8 nm.

According to yet another illustrative, non-limitative embodiment of the present invention, each of the magnetic grains comprises four overlying sub-layers with different magnetic material compositions. The relatively high perpendicular magnetic coercivity $H_{k1}$ of a first sub-layer at the first (upper) end of the columnar-shaped magnetic grains is about 12,000 Oe, and the relatively low perpendicular magnetic coercivity $H_{k4}$ of a fourth sub-layer at the second (lower) end is about 3,000 Oe. The perpendicular magnetic coercivity $H_{k2}$ of a second sub-layer adjacent the first sub-layer is about 9,000 Oe, and the perpendicular magnetic coercivity $H_{k3}$ of a third sub-layer adjacent the second sub-layer is about 6,000 Oe. The thickness of each of the four sub-layers is about 5 nm.

It is noted that, while magnetic materials with coercivity values less than about 500 Oe are typically (or normally) characterized as soft magnetic materials and magnetic materials with coercivity values greater than about 2,000 Oe are typically characterized as hard magnetic materials, all magnetic materials utilized in the present invention have a large intrinsic coercivity, i.e., >~3,000 Oe, and thus would normally be characterized as hard magnetic materials. Notwithstanding this characterization, the difference or variation between the intrinsic coercivities and anisotropies of the component magnetic materials of media according to the present invention can be fairly large, depending upon the purpose or ultimate use of the media design and the recording head field gradient. The invention, therefore, is conceptually different from merely combining hard and soft magnetic materials to form a recording medium. Rather, according to the underlying principle of the present invention, tailoring of the gradient of intrinsic perpendicular magnetic coercivity/anisotropy, as well as the local exchange coupling strengths of the perpendicular media are utilized in conjunction with the recording head field strength to provide the media with maximum gain in SNR, thermal stability, and writability. Optimized media designs facilitated by the present invention afford the smallest actual effective head-media spacing (HMS), highest actual magnetic volume $K_\mu V$, and highest achievable writability at the effective volume $K_\mu V$.

In summary, the present invention provides perpendicular magnetic recording media fabricated with a main recording layer comprised of columnar-shaped magnetic grains with specifically designed gradients of magnetic anisotropy, i.e., gradients of perpendicular magnetic coercivity ($H_k$), and with local exchange coupling strength(s) which provide good writability and signal-to-noise ratio (SNR) at ultra-high recording densities (i.e., >~250 Gbits/in$^2$) and high data recording rates (i.e., >~2,000 Mbits/sec.) without significant sacrifice in thermal stability of the media. In addition, when the magnetization reversal process is incoherent according to the invention, the read/write head spacing is reduced, as compared with the head-media spacing (HMS) with conventional coherent magnetization reversal, resulting in the improved SNR's, i.e., at least a 1-3 db increase in SNR facilitating a corresponding increase in recording density.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A stack, comprising:
   a substrate having at least one surface; and
   a layer stack on the surface of said substrate, the layer stack including a perpendicular recording layer comprising a plurality of columnar-shaped magnetic grains extending perpendicularly between opposing surfaces of the recording layer, each columnar-shaped magnetic grain comprising a plurality of sub-layers including:
   a first sub-layer comprising a first magnetic material and having a first magnetic anisotropy field $H_{k1}$; and
   a second sub-layer disposed on the first sub-layer, the second sub-layer comprising a second magnetic material and having a second magnetic anisotropy field $H_{k2}$, wherein $H_{k1} > H_{k2}$, and the second material differs from the first material in one or both of composition and dopant concentration and wherein at least one of the first and second materials comprises Fe.

2. The stack of claim 1, wherein the second material comprises CoPt.

3. The stack of claim 1, wherein at least one of the first and second materials comprises Pt.

4. The stack of claim 1, wherein each of the sub-layers has a perpendicular magnetic anisotropy field that is greater than at least about 1000 Oe.

5. The stack of claim 1, further comprising:
   a third sub-layer disposed on the second sub-layer, the third sub-layer comprising a third magnetic material and having a third magnetic anisotropy field $H_{k3}$, wherein $H_{k1} > H_{k2} > H_{k3}$, and the third material differs from the first and second materials in one or both of composition and dopant concentration.

6. The stack of claim 5, wherein $H_U$ is between 8,000 and 20,000 Oe and $H_{k3}$ is between 1,000 and 9,000 Oe.

7. The stack of claim 1, further comprising a non-magnetic, paramagnetic, or superparamagnetic spacer layer disposed at an interface between at least one pair of adjacent sub-layers for setting local exchange coupling between the adjacent sub-layers at a preselected strength.

8. The stack of claim 1, wherein the first sub-layer has a first thickness and the second sub-layer has a second thickness and the sum of the first and second thicknesses is less than local exchange coupling distances of the first and second magnetic materials.

9. A stack, comprising:
   a substrate having at least one surface; and
   a layer stack on the surface of said substrate, the layer stack including a perpendicular recording layer comprising a plurality of columnar-shaped magnetic grains extending perpendicularly between opposing surfaces of the recording layer, each columnar-shaped magnetic grain comprising a plurality of sub-layers including:
   a first sub-layer comprising a first magnetic material and having a first magnetic anisotropy field $H_{k1}$; and
   a second sub-layer disposed on the first sub-layer, the second sub-layer comprising a second magnetic material and having a second magnetic anisotropy field $H_{k2}$, wherein $H_{k1} > H_{k2}$ and wherein at least one of the first and second materials comprises Fe.

10. The stack of claim 9, wherein the first material and the second material have different compositions.

11. The stack of claim 10, wherein the second material comprises CoPt.

12. The stack of claim 9, wherein the second magnetic material differs from the first magnetic material in dopant concentration.

13. The stack of claim 9, wherein at least one of the first and second materials comprises Pt.

14. The stack of claim 9, wherein each of the sub-layers has a perpendicular magnetic anisotropy field that is greater than at least about 1000 Oe.

15. The stack of claim 9, wherein each of the sub-layers comprises a cobalt-based alloy.

16. An apparatus, comprising:
   a columnar-shaped magnetic grain comprising:
   a first magnetic layer comprising a first magnetic material and having a first magnetic anisotropy field, $H_{k1}$;

a first spacer layer adjacent to the first magnetic layer;
a second magnetic layer adjacent to the first spacer layer, the second magnetic layer comprising a second magnetic material and having a second magnetic anisotropy field, $H_{k2}$;
a second spacer layer adjacent to the second magnetic layer; and
a third magnetic layer adjacent to the second spacer layer, the third magnetic layer comprising a third magnetic material and having a third magnetic anisotropy field $H_{k3}$, wherein each of the first, second, and third magnetic materials differs from the other magnetic materials in one or both of composition and dopant concentration, and $H_{k1} > H_{k2} > H_{k3}$, wherein each of the magnetic lavers has a perpendicular magnetic anisotropy field that is greater than at least about 1000 Oe.

17. The apparatus of claim 16, wherein at least one of the first, second, and third magnetic materials comprises Pt.

18. The apparatus of claim 16, wherein at least one of the first magnetic layer, the second magnetic layer, and the third magnetic layer comprises at least one of a Co alloy, alternating layers of a Co alloy and a Pt alloy, or alternating layers of a Co alloy and a Pd alloy.

19. The apparatus of claim 16, wherein $H_{k1}$ is between 8,000 and 20,000 Oe and $H_{k3}$ is between 1,000 and 9,000 Oe.

\* \* \* \* \*